United States Patent [19]

Stone

[11] Patent Number: 4,742,299
[45] Date of Patent: May 3, 1988

[54] METHODS OF AND APPARATUS FOR LEVITATING AN EDDY CURRENT PROBE

[75] Inventor: William J. Stone, Kansas City, Mo.

[73] Assignee: The United States of America as represented by the Department of Energy, Washington, D.C.

[21] Appl. No.: 919,166

[22] Filed: Oct. 15, 1986

[51] Int. Cl.$^4$ ............... G01B 7/10; G01R 33/12; G01N 27/90

[52] U.S. Cl. ................... 324/230; 73/661; 269/20; 324/226; 324/262

[58] Field of Search ............ 324/207, 208, 225, 226, 324/229-231, 234-240, 262; 73/37, 37.5, 37.6, 37.7, 661; 269/20, 22, 35

[56] References Cited

U.S. PATENT DOCUMENTS

| | | |
|---|---|---|
| 3,359,495 | 12/1967 | McMaster et al. |
| 3,495,442 | 2/1970 | Rejsa ................... 73/37.6 |
| 3,513,555 | 5/1970 | Vachon ............... 324/231 X |
| 3,528,002 | 9/1970 | Dunlavey ............. 324/231 |
| 3,818,327 | 6/1974 | Alexander ........... 324/231 |
| 3,855,524 | 12/1974 | Crawford . |
| 3,884,076 | 5/1975 | Studer . |
| 4,107,606 | 8/1978 | Typpo et al. ........ 324/229 |
| 4,325,249 | 4/1982 | Berglund ............. 73/37.6 |
| 4,434,649 | 3/1984 | Williams ............. 324/229 |
| 4,437,062 | 3/1984 | Donnelly ............. 324/238 |
| 4,450,404 | 5/1984 | Williams et al. ..... 324/229 X |
| 4,528,507 | 7/1985 | Domin et al. ........ 324/229 |

Primary Examiner—Gerard R. Strecker
Attorney, Agent, or Firm—George H. Libman; James H. Chafin; Judson R. Hightower

[57] ABSTRACT

An eddy current probe is supported against the force of gravity with an air bearing while being urged horizontally toward the specimen being examined by a spring and displaced horizontally against the force of the spring pneumatically. The pneumatic displacement is accomplished by flowing air between a plenum chamber fixed with respect to the probe and the surface of the specimen. In this way, the surface of the specimen can be examined without making mechanical contact therewith while precisely controlling the distance at which the probe stands-off from the surface of the specimen.

10 Claims, 1 Drawing Sheet

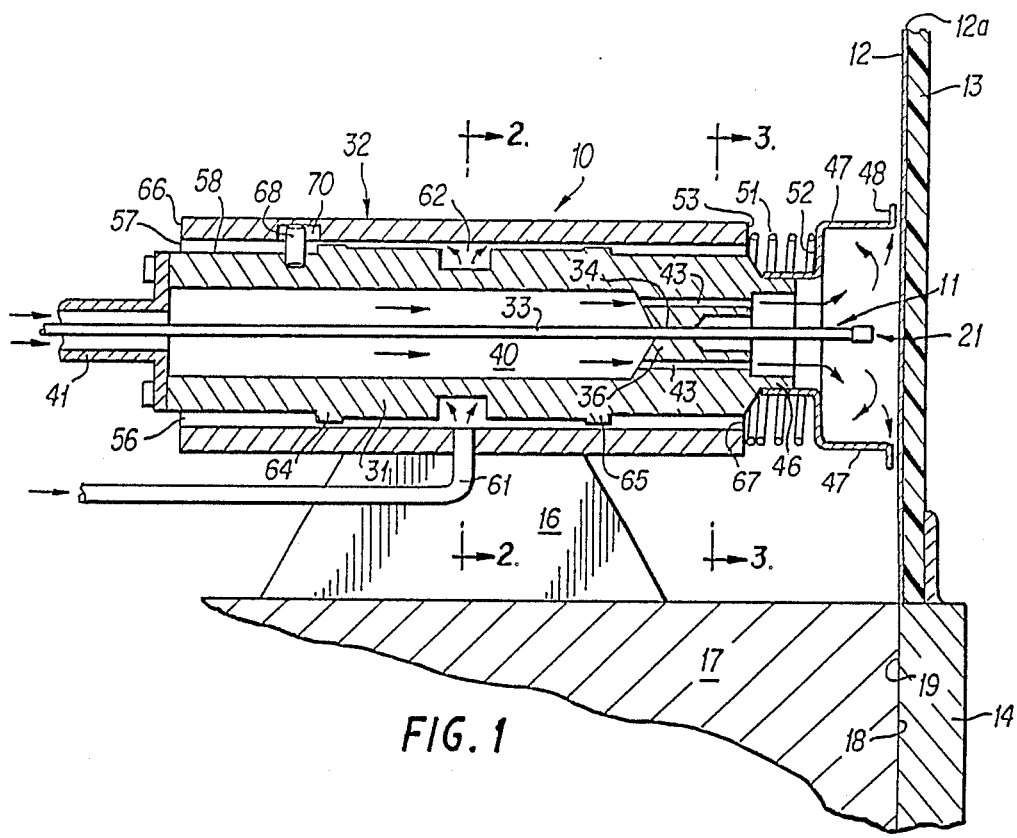
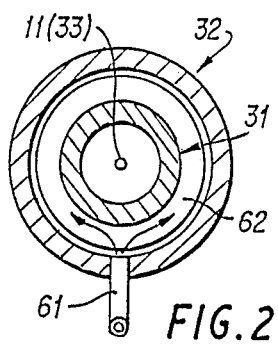
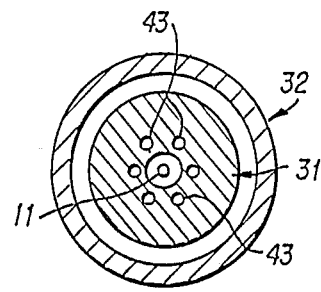
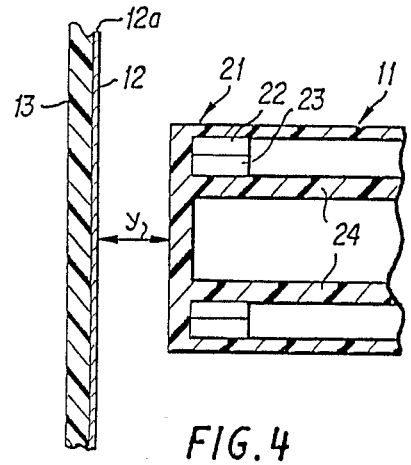

METHODS OF AND APPARATUS FOR LEVITATING AN EDDY CURRENT PROBE

The Goverment has rights in this invention under Contract DE-AC04-DP00613 between the Department of Energy and Allied Corporation.

BACKGROUND OF THE INVENTION

1. Field of the Invention

The instant relates to methods of and apparatus for levitating an eddy current probe. More particularly, the instant invention is directed to methods of and apparatus for levitating an eddy current probe wherein the probe is presented to specimens with a stand-off distance that is precise, constant and highly reproducible.

2. Technical Considerations and Prior Art

In photomicrolithography it is well-known to use eddy current technology to measure and control precision thicknesses of metallic film, vapour deposited in layers measured in the range of tens of microinches. Generally, an eddy current probe utilizes a miniature transformer having two coils mounted in close concentricity with one another. By bringing the probe into proximity with a conductive metallic specimen while exciting the primary coil thereof with an alternating current, the mutual inductance of the pair of coils is altered. This results in induction of eddy currents in the specimen by the magnetic fields of the probe coils. The strength of the eddy current field is deduced from a change in the reactance of the probe. The eddy current activity in the specimen film is inversely proportional to the distance (lift-off) between the coils and the conductive specimen. If the "lift-off" is a constant the measured reactance of the probe system is a function of the thickness, magnetic permeability, electrical conductivity, and density of the metal specimen, as well as some other metallurgical texture characteristics of the specimen. Various approaches for measuring one of these parameters while holding the others constant has resulted in a number of commercial instruments. However, all of these approaches are deficient because the reactance measurement is compromised by "lift-off" phenomena. In most situations, all of the other factors can be adequately controlled except lift-off. Accordingly, precise thickness measurements are not possible since probe proximity and presentation attitudes are not precisely controlled.

Most commercial probes are hand held, pencil-like devices with coils mounted in the free ends, thereof. Since these probes are manually pressed against the surface of the specimen, it is difficult to control pressure and coil orientation making thickness measurements in the ten micrometers regime quite unreliable.

There are several inexpensive devices in use which are adequate for low precision work. For example, a concentric, non-conducting bushing installed over a typical pencil probe provides it with a larger attitude orienting contact face. Crude wheeled vehicles are available for transporting the probes at a "constant" attitude and stand-off distance with respect to the surface of the specimen being tested. There is a device available from the Helmut Fischer Instrument Company in which transducers are spring loaded and presented to the surface of a specimen with a small arbor press so as to better control pressure and orientation. The makers of this device claims that it is possible to measure highly replicated average thicknesses in the range of $+/-0.05$ mm from a reference line. However, there are indications that the precisions of a single measurement could approach $+/-0.01$ mm on PVD aluminum and copper if the difficulties resulting from lift-off could be eliminated.

The patent literature includes a number of references that suggest floating an instrument with air pressure; e.g., U.S. Pat. Nos. 3,855,524 to Crawford; 3,884,076 to Studer; 4,450,404 to Williams et al.; and 4,528,507 to Domin et al. In each of these patents, the lift-off of the probe from the specimen is gravity opposed. The probe itself is lifted by the same column or film of air which is used to space the probe from the specimen. Accordingly, the devices are somewhat unstable in that stand-off of the probes is a function of a single air pressure source which must be sufficiently large to overcome the force of gravity on the total weight of the levitated device. This economy of regulation preempts a delicate adjustment of lift-off.

In view of the deficiencies of prior art approaches, it is necessary to provide methods of and apparatus for levitating a probe wherein the attitude of the probe is highly reproducible with little pitch or yaw during presentation. Moreover, it is desirable to have a probe which adjusts and maintains a preselected stand-off distance to within $+/-20$ millionths of an inch for the transducer of the probe. It may be necessary to accomplish the aforementioned without mechanically contacting the surface of the specimen so as to avoid physical damage thereto.

Finally it is desirable to move the work relative to the probe such that the probe hovers over the work at a fixed lift-off while continuous readings of the reactance are read—i.e., a scanning eddy current probe.

OBJECT OF THE INVENTION

It is an object of the instant invention to provide new and improved methods of and apparatus for levitating probes, such as eddy current probes, from specimens being examined thereby.

SUMMARY OF THE INVENTION

The instant invention contemplates apparatus for supporting an eddy current probe while the eddy current probe examines a specimen. The eddy current probe is supported against the force of gravity by a gas bearing supplied by a #1 gas source that supports a floating member which is in turn, biased in a horizontal direction toward the specimen with a pre-selected force. In order to stand the probe off from the surface of the specimen, a film of gas is flowed between the floating member and the specimen creating a pneumatic force (supplied by a #2 gas source) opposed to that biasing the probe toward the specimen.

The apparatus further contemplates utilizing a plenum to stabilize and restrain the gas cushion (which may be air) creating the pneumatic force opposing the force biasing a probe toward the specimen.

The invention further contemplates a method inherent in using the aforedescribed apparatus wherein the probe is supported against the force of gravity by a gas bearing, urged toward the specimen by a horizontal force and displaced from the specimen by an opposing pneumatic horizontal force created by flowing gas between the support for the probe and the surface of the specimen.

The method further contemplates precisely controlling the pneumatic source providing the flow of gas used solely for lift-off while coarsely regulating the pressure of the gas used solely to float the probe in the gas bearing. Preferably, the distance that the probe stands-off from the surface of the specimen is controlled with respect to a preselected distance to within +/−100 millionths of an inch, and more preferably, within +/−20 millionths of an inch.

Upon further study of the specification and appended claims, further objects and advantages of this invention will become apparent to those skilled in the art.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views, and wherein:

FIG. 1, is a side elevation of eddy current probe support apparatus in accordance with the instant invention;

FIG. 2, is a cross-section of the eddy current probe support apparatus of FIG. 1 taken along lines 2—2 of FIG. 1;

FIG. 3, is a cross-section of the eddy current probe support apparatus shown at FIG. 1 taken along lines 3—3 thereof, and FIG. 4 is an enlarged cross-section of an end portion an eddy current probe illustrating two coils of a miniature transformer comprising a typical eddy current transducer.

DESCRIPTION OF THE PREFERRED EMBODIMENT

Referring now to FIG. 1, there is disclosed a support apparatus, designated generally by the numeral 10, for supporting an eddy current probe 11 in proximity with the surface 12 of the specimen 13. Preferably, the specimen 13 is fixed to a first support 14 and extends vertically with respect to support 14 so as to present the surface 12 vertically. The surface 12 of the specimen 13 may be, for example, on a PVD metallic coating 12a (thickness exaggerated) in the ten micron range such as might be utilized in thin film plating, photolithography or integrated circuit manufacture. It is frequently important that such coatings be free of scratches, fisures and cracks and that the coatings be of uniform thickness. In order to avoid scratching the surface 12, the instant invention spaces the probe 11 from the surface while the surface is under examination.

The support apparatus 10 for the probe 11 is mounted on a pedestal 16 which projects from a second support 17. Preferably, the second support 17 has a flat surface 18 which slidably abuts a flat surface 19 on the first support 14. This enables the second support to move in two dimensions while in abutment with the first support in order to allow the probe 11 to scan the surface 12 with the probe having its distance from the surface determined by fluid levitation in accordance with the principles of the instant invention.

Referring now to FIG. 4, where a typical transducer 21, of a probe 11 includes an outer coil 22 and an inner coil 23 in close proximity to one another and wound about an annular insulator 24. Proximate to the insulator 24 is a metallic conductor specimen film 12 into which are induced eddy currents by the magnetic fields of the coils 22 and 23. The strength of the induced eddy current field is a function of the distance y and of the thickness, magnetic permeability, electrical conductivity, density and metallurgical texture characteristics of the metallic surface 12 being examined. Any minute anomalies in the surface 12 will cause a detectable variation in the reactance of the transducer 21. Since the anomalies are minute, it is important to maintain a specific distance "y" between the tranducer 21 and the surface 12. Preferably, the probe 11 stands-off and can be maintained from the surface 12 by the distance "y" within an error in the range of a few ten-millionths of an inch (and even more preferably within twenty-millionths of an inch). Referring again to FIG. 1, the stand-off from the surface 12 of the specimen 13 as explained in FIG. 4 is accomplished by securing the probe 11 in a cylindrical offset vehicle, designated by numeral 31, which is pneumatically floated within a barrel, designated generally by the numeral 32, that is fixed to the pedestal 16. The cylindrical offset vehicle 31 rigidly supports a stiff stem portion 33 of the probe 11 which is fixed within a complimentary bore 34 in a constricted portion 36 of the cylindrical offset vehicle 31.

The offset vehicle 31 has a bore 40 therethrough which is connected to a precise air source by an air line 41. The precise air source is generated by a device such as the "Bendix Sheffield Precisionaire", which is a combined pressure regulator and rotometer instrument designed for air gaging and provides a precise, resetable flow of air. The flow of air from the precise air source flows through the chamber 40; through a plurality of parallel, axialy extended bores 43, and through the constricted portion 36 of the offset vehicle 31. The offset vehicle 31 is necked down at the end juxtaposed with the transducer 21 to provide an annular shoulder 46 to which is secured an annular plenum 47. Air exiting from the bores 43 flows into the plenum 47 and flows out of the plenum between an annular flange 48 at the free end of the plenum and the surface 12 of the specimen 13 being examined. The column of air in the plenum generated by the constant flow acts as air spring to maintain a fixed distance between the surface 12 and flange 48 which varies only within a few hundred ten millionths of an inch and preferably only within twenty millionths of an inch of the desired stand-off distance.

In order to maintain the desired stand-off distance, the air flow must react against a restoring force. In conventional arrangements the restoring force is supplied by gravity. In the instant invention however the restoring force is supplied by a delicate, configured to approach a constant force over the operating range, coil spring 51 positioned in compression between a shoulder 52 on the plenum 47 and the end 53 of barrel 32.

In order to substantially free the offset vehicle 31 from mechanical friction, the offset vehicle floats on an air bearing in a chamber 56 defined by the cylindrical inner wall 57 of the barrel 32 and cylindrical outer wall 58 of the offset vehicle. By floating the offset vehicle 31, the distance between the probe 11 and surface 12 is determined substantially by the constant force of spring 51 and the precisely controlled air flow between the flange 48 and surface 12.

The air bearing formed in chamber 56 is created by injecting air at approximately 20 psi from a coarse air source through an inlet line 61 so as to flow around an annular groove 62 formed in the offset vehicle 31. The air in the groove 62 flows out of the groove in a longitudinal direction and over projecting, annular air dams 64 and 65 before exhausting through opposite ends 66 and 67 of the barrel 32. In order to keep the offset vehicle 32 from rotating within the barrel, a pin 68 may project therefrom for receipt in a slot 70 formed in the inner wall 57 of the barrel 32.

The aforedescribed arrangement provides a solution to at least three liftoff problems in that it presents the probe 11 to the specimen surface 12 at a highly reproducable attitude with minimal pitch and yaw. There is no contact with the surface 12 of the specimen 13 and therefore physical damage to the expensive, delicate metallic film 12a is avoided while a +/− twenty millionths of an inch variation in the stand-off distance from a selected stand-off distance "y" is achieved. Moreover, alignment of the probe 11 with the surface 12 is achieved while utilizing readily available construction materials and arrangements which do not have current affecting conductivities, permeabilites or magnetic fields that may adversely affect operation of the probe.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. Pointing apparatus for supporting and presenting an eddy current probe normal to and in proximity with a specimen in a vertical plane, the apparatus comprising:
   translating base means for movement normal to the specimen plane;
   a floatable member having an eddy current probe fixed thereto;
   air bearing means, supported on said base means, for levitating said floatable member with respect to the base means in a vertical direction against the force of gravity;
   biasing means, cooperating with said air bearing means, for urging said floating member toward the specimen in a horizontal direction; and
   pneumatic means for displacing said floating member and probe perpendicular to the specimen against the force of said biasing means, whereby said eddy current probe examines the specimen while displaced therefrom in the horizontal direction and while levitating with respect to the base in the vertical direction.

2. The apparatus of claim 1, wherein said pneumatic means includes an open faced plenum which surrounds said probe; and means for applying a precise, specific air flow to said plenum.

3. The apparatus of claim 2, wherein said air bearing comprises a barrel affixed to said base and having a horizontally extending chamber therein, within which chamber said floating member is supported, and an air inlet source for continuously supplying pressurized air between said floating member and said horizontal chamber.

4. The apparatus of claim 3, wherein said biasing means comprises a spring disposed between said floating member and said barrel for urging said plenum chamber toward the specimen.

5. The apparatus of claim 4, wherein both the chamber within said barrel and said floating member are cylindrical and wherein means are provided for preventing said floating member from rotating within said barrel.

6. The apparatus of claim 5, wherein said floating member has a bore therein connected to the precise air source, which bore communicates with a plurality of bores surrounding a support for the probe and wherein the plenum chamber is disposed downstream of the plurality of bores and communicates therewith, whereby the plenum chamber is filled with air flowing from the plurality of bores.

7. A method of examining the surface of a specimen with an eddy current probe, the method comprising the steps of:
   disposing the surface of the specimen to be examined in a vertical orientation;
   floating the probe pneumatically to support the probe against the force of gravity;
   urging the probe horizontally toward the surface of the specimen with a predetermined force;
   displacing the probe in the horizontal direction against the predetermined force by flowing fluid between the probe and the surface of the specimen, wherein the probe is maintained a selected distance from the surface; and
   moving the floatingly supported probe parallel to the surface of the specimen.

8. The method of claim 7, wherein the pressure for the air bearing supporting the floating member is approxiamtely twenty psi and wherein the pressure for pneumatically displacing the floating member from the specimen is approximately ten psi, the rate of flow of the air used for horizontal displacement being precisely controlled.

9. The method of claim 8, wherein the specimen is a planar member having a metallic surface deposited thereon and wherein the probe is maintained within plus or minus one hundred millionths of an inch of the selected distance.

10. The method of claim 8, wherein the specimen is a planar member having a metallic surface deposited thereon and wherein the probe is maintained a selected distance from the surface within plus or minus twenty millionths of an inch.

* * * * *